US012303923B2

(12) United States Patent
Zhou et al.

(10) Patent No.: US 12,303,923 B2
(45) Date of Patent: May 20, 2025

(54) AUTOMATIC ADHESIVE SPRAYING CONTROL SYSTEM FOR PROGRESSIVE DIE OF MOTOR IRON CORE OF NEW ENERGY VEHICLE

(71) Applicant: NINGBO ZHENYU TECHNOLOGY CO., LTD., Ningbo (CN)

(72) Inventors: Maowei Zhou, Ningbo (CN); Xiudong Huang, Ningbo (CN); Lizhu Zhong, Ningbo (CN)

(73) Assignee: NINGBO ZHENYU TECHNOLOGY CO., LTD., Ningbo (CN)

( * ) Notice: Subject to any disclaimer, the term of this patent is extended or adjusted under 35 U.S.C. 154(b) by 756 days.

(21) Appl. No.: 17/417,257

(22) PCT Filed: Jun. 28, 2020

(86) PCT No.: PCT/CN2020/098532
§ 371 (c)(1),
(2) Date: Jun. 22, 2021

(87) PCT Pub. No.: WO2021/248571
PCT Pub. Date: Dec. 16, 2021

(65) Prior Publication Data

US 2022/0323981 A1 Oct. 13, 2022

(30) Foreign Application Priority Data

Jun. 11, 2020 (CN) ......................... 202010530524.7

(51) Int. Cl.
*B05B 1/30* (2006.01)
*B05B 7/08* (2006.01)
*B05B 12/08* (2006.01)
*B05C 11/10* (2006.01)
*H02K 15/02* (2006.01)

(52) U.S. Cl.
CPC .......... *B05B 12/087* (2013.01); *B05B 1/3046* (2013.01); *B05B 7/0892* (2013.01); *B05C 11/1013* (2013.01); *H02K 15/02* (2013.01)

(58) Field of Classification Search
None
See application file for complete search history.

(56) References Cited

U.S. PATENT DOCUMENTS 5,603,984 A * 2/1997 Keim .................... B05B 15/654 427/236
5,785,252 A * 7/1998 Keim ...................... B05B 12/18 239/422

(Continued)

FOREIGN PATENT DOCUMENTS

CN 201900066 U 7/2011
CN 208600061 U 3/2019

*Primary Examiner* — Binu Thomas

(57) ABSTRACT

The present invention discloses an automatic adhesive spraying control system for a progressive die of a motor lamination core of a new energy vehicle. During stamping of the progressive die, a nozzle is moved downward under the effect of downward movement of a steel strip, such that a gap is defined between a side wall of a conical head of the nozzle and an inner side wall of a first conical hole of the nozzle. An ejecting hole ejects an adhesive subjected to air pressure regulation, such that different gas pressures can be used for adhesive spots and adhesive channels at different positions.

10 Claims, 11 Drawing Sheets

16 10 101 2 103 102 3 104 26 27 28 11 111 4

262 30 29 26 2 3 28 261 27 103 10 263 102

(56) References Cited

U.S. PATENT DOCUMENTS 11,909,278 B2 * 2/2024 Xiang .................... B21D 28/26
2009/0140009 A1 6/2009 Chen
2010/0224652 A1 9/2010 Kim
2017/0297078 A1 * 10/2017 Nishinaka ........... B05C 11/1044

* cited by examiner

AUTOMATIC ADHESIVE SPRAYING CONTROL SYSTEM FOR PROGRESSIVE DIE OF MOTOR IRON CORE OF NEW ENERGY VEHICLE

CROSS REFERENCE TO RELATED APPLICATIONS

This application is a national stage filing under 35 U.S.C. § 371 of international application number PCT/CN2020/098532, filed on Jun. 28, 2020, which claims priority to Chinese patent application No. 202010530524.7, filed on Jun. 11, 2020. The contents of these applications are incorporated herein by reference in their entirety.

TECHNICAL FIELD

The present disclosure relates to the technical field of manufacturing of motor lamination cores of new energy vehicles, and in particular, relates to an automatic adhesive spraying control system for a progressive die of a motor lamination core of a new energy vehicle.

BACKGROUND

At present, new energy vehicles are being widely promoted and widely applied, especially, electrical vehicles. However, with respect to the new energy vehicles, the drive motor lamination core is the heart of the motor, and manufacturing thereof is being constantly concerned. However, in the related art, protrusions and recesses for riveting are formed on iron core thin sheets, and these structures are fitted with each other during lamination to achieve riveting, which is referred to as a lamination riveting process, and upon the lamination, the iron core thin sheets are bonded by laser welding, which is referred to as a lamination welding process. However, due to failure to produce magnetic characteristics at the bonding position and the like demerits, a lamination bonding method is developed. During manufacturing of the conventional motor lamination core, typically, iron core sheets are cut and tailored, and the adhesive is applied by an adhesive dispenser, and then the iron core sheets are laminated and fixed manually, refer to U.S. Patent Publication No.: US20180358868 A1.

SUMMARY

In view of the above defects, the present disclosure is intended to provide an automatic adhesive spraying control system for a progressive die of a motor iron core of a new energy vehicle.

An automatic adhesive spraying control system for progressive die of motor lamination core of a new energy vehicle according to the present disclosure includes a nozzle and a nozzle fixing plate, the nozzle fixing plate being provided with a mounting chamber, the nozzle being received in the mounting chamber, a top portion of the mounting chamber being a first conical hole with an upper port being smaller than a lower port, a cone at a top of the nozzle being correspondingly inserted into the first conical hole, a spring being arranged in the mounting chamber, two ends of the spring being respectively abutted against a bottom of the nozzle and a bottom side wall of the mounting chamber; wherein a side wall of the cone at the top of the nozzle is provided with an ejecting hole, the side wall of the cone provided with the ejecting hole is attached to an inner side wall of the first conical hole, the top of the nozzle extends out of the upper port of the first conical hole, and an inlet orifice in communication with the mounting chamber is arranged at a bottom of the nozzle fixing plate; an adhesive supply device being connected to the inlet orifice via a pipe, an air pressure control system being mounted on the adhesive supply device, the air pressure control system supplying a push air pressure to an adhesive in the adhesive supply device and regulating a supplied push air pressure, such that a pressure ejected by the ejecting hole of the nozzle for ejecting the adhesive is controlled and regulated.

Preferably, the nozzle fixing plate includes an upper plate and a lower cushion plate, a positioning hole being arranged in a top surface of the upper plate, a nozzle positioning cylinder being arranged in the positioning hole, a top end surface of the nozzle positioning cylinder being flush with the top surface of the upper plate, the nozzle being arranged in the first conical hole at an upper end of an inner hole of the nozzle positioning cylinder; wherein the spring is arranged in the inner hole of the nozzle positioning cylinder, the lower cushion plate is positioned on a bottom surface of the upper plate, a recess in communication with the inner hole of the nozzle positioning cylinder is arranged on the bottom surface of the upper plate, and two ends of the spring are respectively abutted against the lower cushion plate and the nozzle, an adhesive passage being formed between the recess and a top surface of the lower cushion plate, an inlet in communication with an inner chamber being arranged on the lower cushion plate, a pipe connector being mounted on the inlet;

Preferably, a groove is arranged on the top surface of the upper plate, a press plate being fixed to a groove bottom of the groove; wherein the positioning hole is arranged at the groove bottom of the groove, a middle ring body of the nozzle positioning cylinder is retained on a step on an inner side wall of the positioning hole, and the press plate presses against the middle ring body of the nozzle positioning cylinder.

Preferably, the automatic adhesive spraying control system further includes a die, wherein the nozzle fixing plate is arranged in a die hole of the die, and a retaining plate is fixed to the die, a side step of the retaining plate mating with a step of the nozzle fixing plate to retain the nozzle fixing plate.

Preferably, a sealing member is arranged between the middle ring body of the nozzle positioning cylinder and the step on the inner side wall of the positioning hole, such that a sealing configuration is constructed between the nozzle positioning cylinder and the positioning hole.

Preferably, when the adhesive ejected by the nozzle is an anaerobic adhesive, a promoter is sprayed on a top surface of a strip prior to stamping of the strip.

Preferably, a strip is arranged over the die, and a side guide plate is arranged at a side position of the strip, the side guide plate being fixed to the die, the strip being arranged between an extending portion of the side guide plate and the die, a mounting through hole being arranged at the extending portion of the side guide plate, a magnet being fitted and fixed in the mounting through hole.

Preferably, an inner hole at a bottom of the first conical hole on the nozzle positioning cylinder is a second conical hole with an upper port being smaller than a lower port, the upper port of the second conical hole and the lower port of the first conical hole having an identical diameter.

Preferably, the automatic adhesive spraying control system further includes an elevating drive device configured to drive the upper plate, the lower cushion plate, and the nozzle to be simultaneously displaced upward and downward; wherein the elevating drive device is mounted on a bottom surface of a lower cushion plate and includes an air cylinder, and an elevating block is positioned on the bottom surface of the lower cushion plate, a pull-out plate being attached on a bottom surface of the elevating block, the bottom surface of the elevating block and a top surface of the pull-out plate defining a plurality of mating tooth blocks by virtue of a plurality of mating slots that are equally spaced apart, the mating tooth blocks being correspondingly inserted into the mating slots; a side wall of the mating slot on the elevating block is attached to a side wall of the mating slot on the pull-out plate, and the two attached side walls are ramps with an identical inclination angle; and a piston rod end portion of the air cylinder is fixedly connected to one end of the pull-out plate.

Preferably, the adhesive supply device includes an adhesive cylinder, an air pressure distribution control cabinet configured to regulate an air pressure for air compression, and an adhesive cylinder diverter, a plurality of inlet orifice are arranged on the lower cushion plate, and the pipe connector is arranged on each of the inlet orifices; wherein an adhesive inlet and a plurality of diverting outlets are arranged on the adhesive cylinder diverter, an air outlet of the air pressure distribution control cabinet is in communication with an adhesive inlet port of the adhesive cylinder by the pipe, an adhesive outlet port of the adhesive cylinder is in communication with an adhesive inlet on the adhesive cylinder diverter, and the diverting outlets are respectively in communication with the pipe connectors by the pipe.

Preferably, the air pressure distribution control cabinet comprises a cabinet and at least two depressurizing devices arranged in the cabinet, an air inlet on the cabinet is in communication with at least two branch air pipes, each of the branch air pipes being in communication with the corresponding depressurizing device by a branch pipe, an air outlet of the depressurizing device being in communication with the air outlet on the cabinet.

Preferably, the depressurizing device includes a plurality of depressurizing valves, an air inlet of each of the depressurizing valves being in communication with the branch air pipe by the branch pipe, and an air outlet of the depressurizing valve being in communication with the air outlet of the cabinet by the pipe.

Preferably, a liquid flowmeter is arranged on the pipe connected between the adhesive cylinder and the adhesive cylinder diverter; wherein an upper flow limit and a lower flow limit are predefined in the liquid flowmeter, and an alarm is generated by an alarming device when a flow of a liquid discharged from the pipe exceeds the upper flow limit or the lower flow limit.

Preferably, based on a stamping speed output by a stamping device used by the progressive die, the depressurizing valve is correspondingly controlled to regulate a pressure of an output gas, such that a pressure of the adhesive ejected by the nozzle is regulated.

Preferably, the automatic adhesive spraying control system further includes an upper die seat, an unloading plate seat, an unloading plate, a recessed die fixing plate, and a lower die seat; wherein the lower die seat is provided with a recessed chamber, the pull-out plate and a translation plate are both arranged in the recessed chamber, the air cylinder is fixed to the lower die seat, the recessed die fixing plate is fixed to a position, at an upper opening of the recessed chamber, of a top surface of the lower die seat, the nozzle is arranged in the die hole where the recessed die is fixed, a top surface of the nozzle fixing plate is flush with a top surface of the recessed die fixing plate, the upper die seat is arranged above the recessed die fixing plate, the unloading plate is fixed to a bottom surface of the upper die seat, and the unloading plate is fixed to the bottom surface of the unloading plate seat.

The automatic adhesive spraying control system for the progressive die of the motor lamination core of the new energy vehicle according to the present disclosure is applicable to the progressive die. The progressive die includes a stamping head and a plurality of stamping dies (die sets) formed by a mold. Specifically, an iron core thin sheet is formed by stamping a steel strip transferred in an intermittent fashion by the progressive die. During stamping, the nozzle is moved downward under the effect of downward movement of the steel strip, such that a gap is defined between the side wall of the conical head of the nozzle and the inner side wall of the first conical hole of the nozzle, and hence the ejecting hole of the nozzle is opened. The ejecting hole ejects the adhesive subjected to air pressure regulation, such that the bottom surface of a finally molded lamination core is attached with the adhesive. In this way, the lamination cores gradually formed in the stamping process are stacked, and upon stacking, the lamination cores are bonded securely and reliably by the adhesive, thereby completing manufacturing of the lamination core. Further, by the air pressure control system, the adhesive points and adhesive passages at different positions may employ different air pressures. In addition, the size of the adhesive points and the adhesive amounts may be accurately controlled, and adhesive points may be configured on very small groove ribs.

In addition, independent operating stations may be practiced, independent control is implemented, the structure is simple, and the repair and maintenance is convenient. Further, in the device, each adhesive ejecting point may employ an independent structure. When the adhesive fails to be ejected or has been ejected excessively, a pressure and flowmeter generates an alarm. By the configuration where the nozzle and the nozzle fixing plate may be caused to simultaneously move downward, the iron core sheet at the bottom of the lamination core of the motor is arranged in the recessed die fixing plate, and the nozzle is not in contact with the iron core sheet to prevent the iron core from being attached with the adhesive. In this way, layered functions of the lamination core of the motor are implemented.

DETAILED DESCRIPTION

The technical solutions in the embodiments of the present disclosure are described in detail clearly and completely hereinafter with reference to the accompanying drawings for the embodiments of the present disclosure. Apparently, the described embodiments are only a portion of embodiments of the present disclosure, but not all the embodiments of the present disclosure. Based on the embodiments of the present disclosure, all other embodiments derived by persons of ordinary skill in the art without any creative efforts shall fall within the protection scope of the present disclosure.

Embodiments

Figure 1:
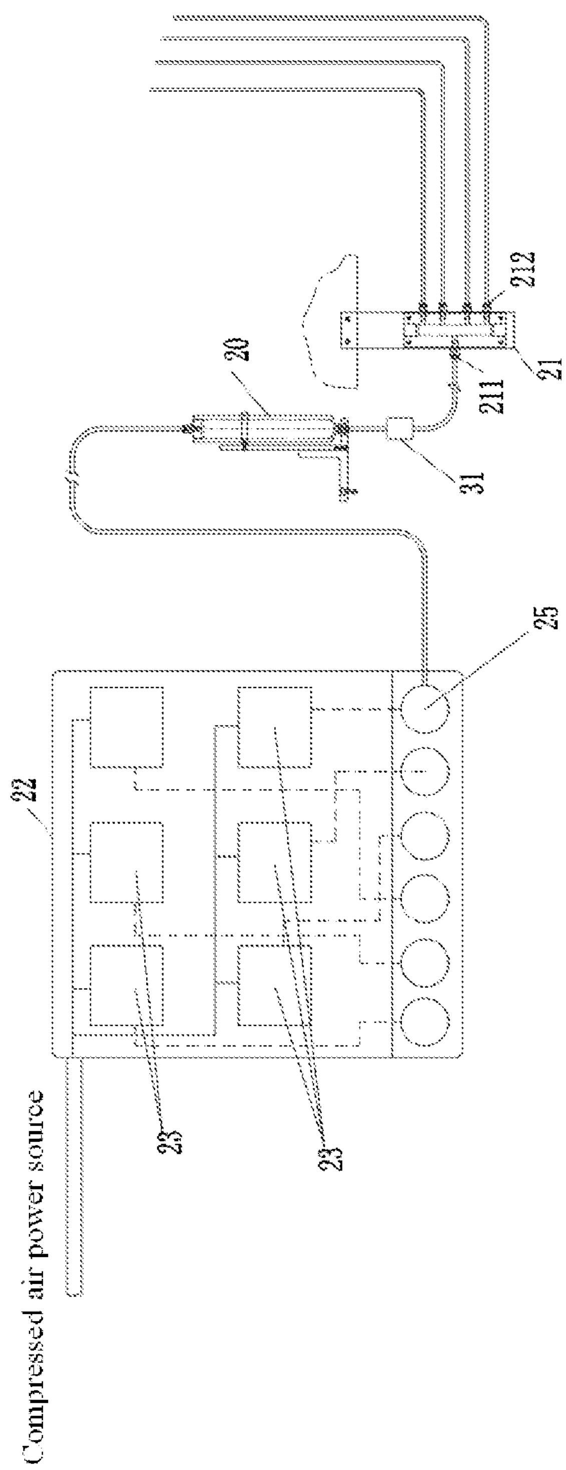
FIG. 1 is a schematic structural view of an air pressure control system in combination with an adhesive according to an embodiment.
Figure 2:
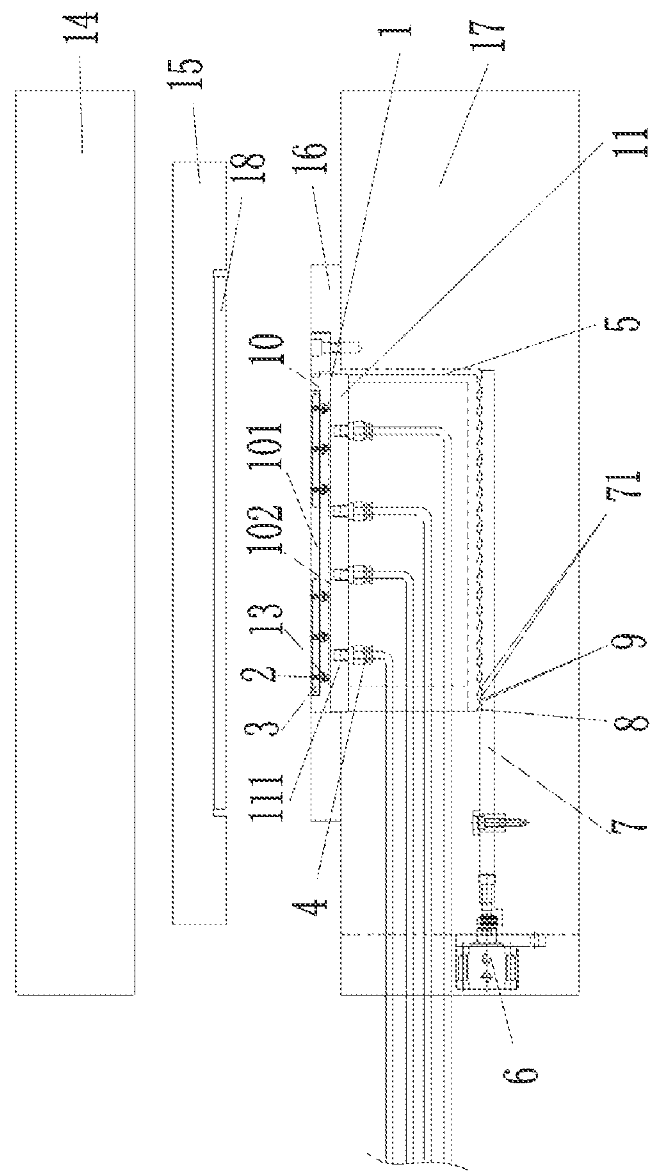
FIG. 2 is a schematic structural view of a lamination core manufacturing device according to an embodiment.
Figure 3:
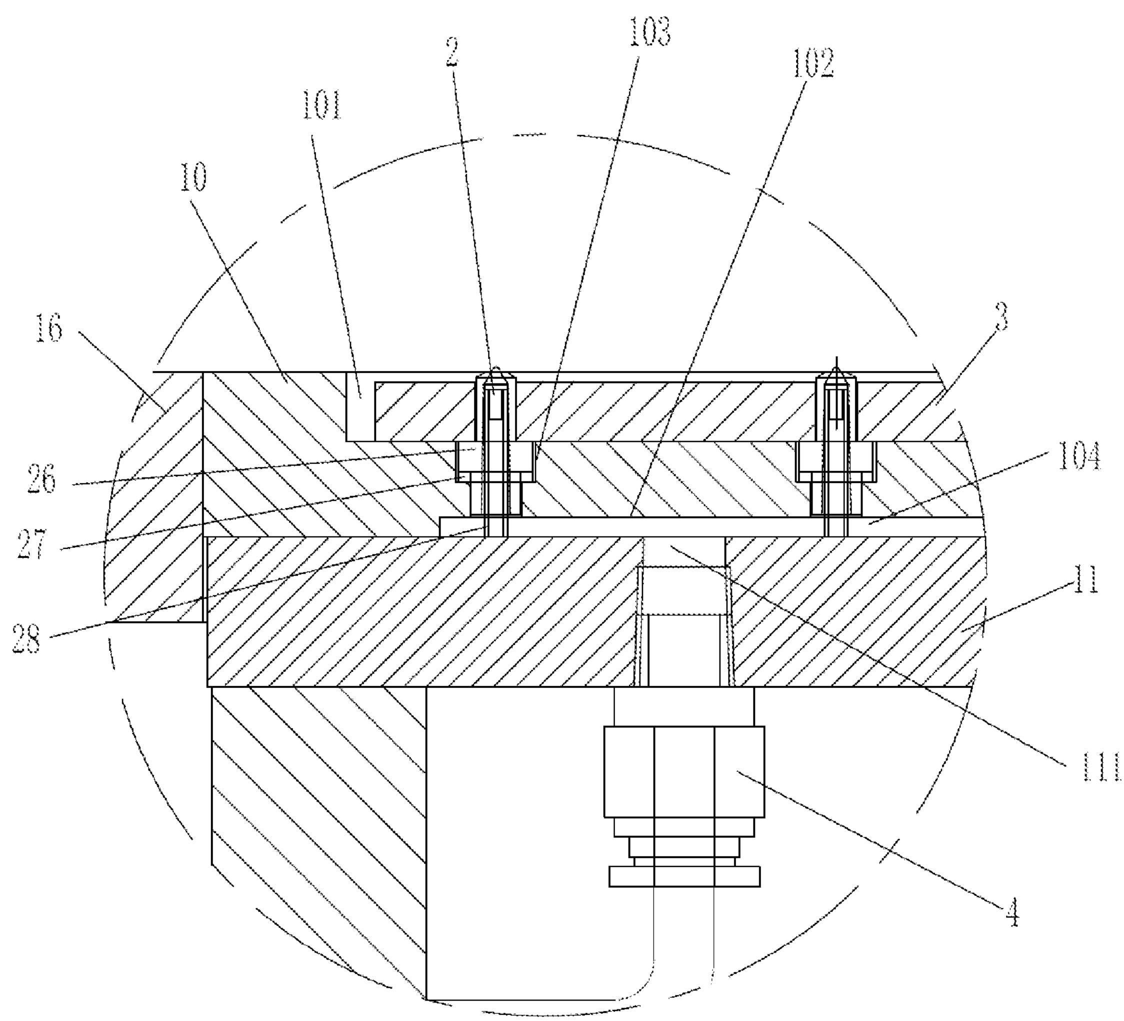
FIG. 3 is a first partially enlarged view according to an embodiment.
Figure 4:
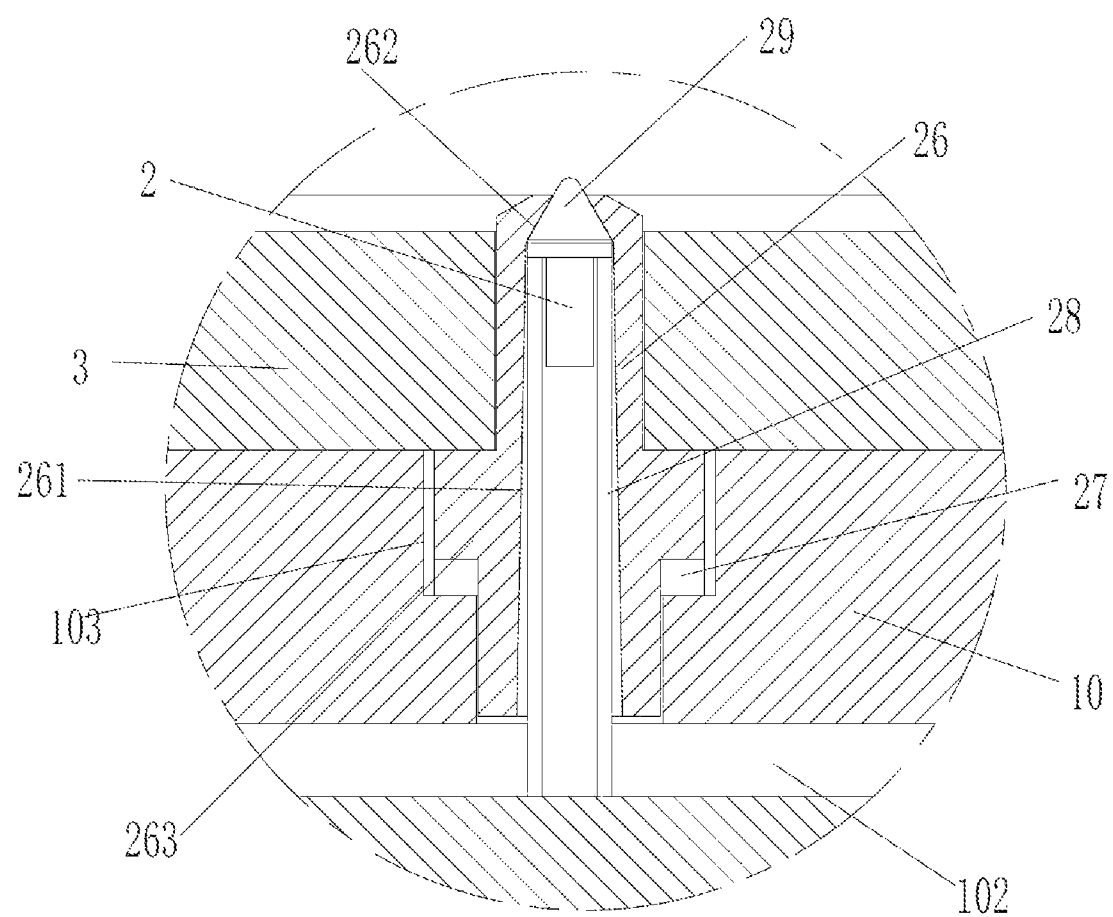
FIG. 4 is a second partially enlarged view according to an embodiment.
Figure 5:
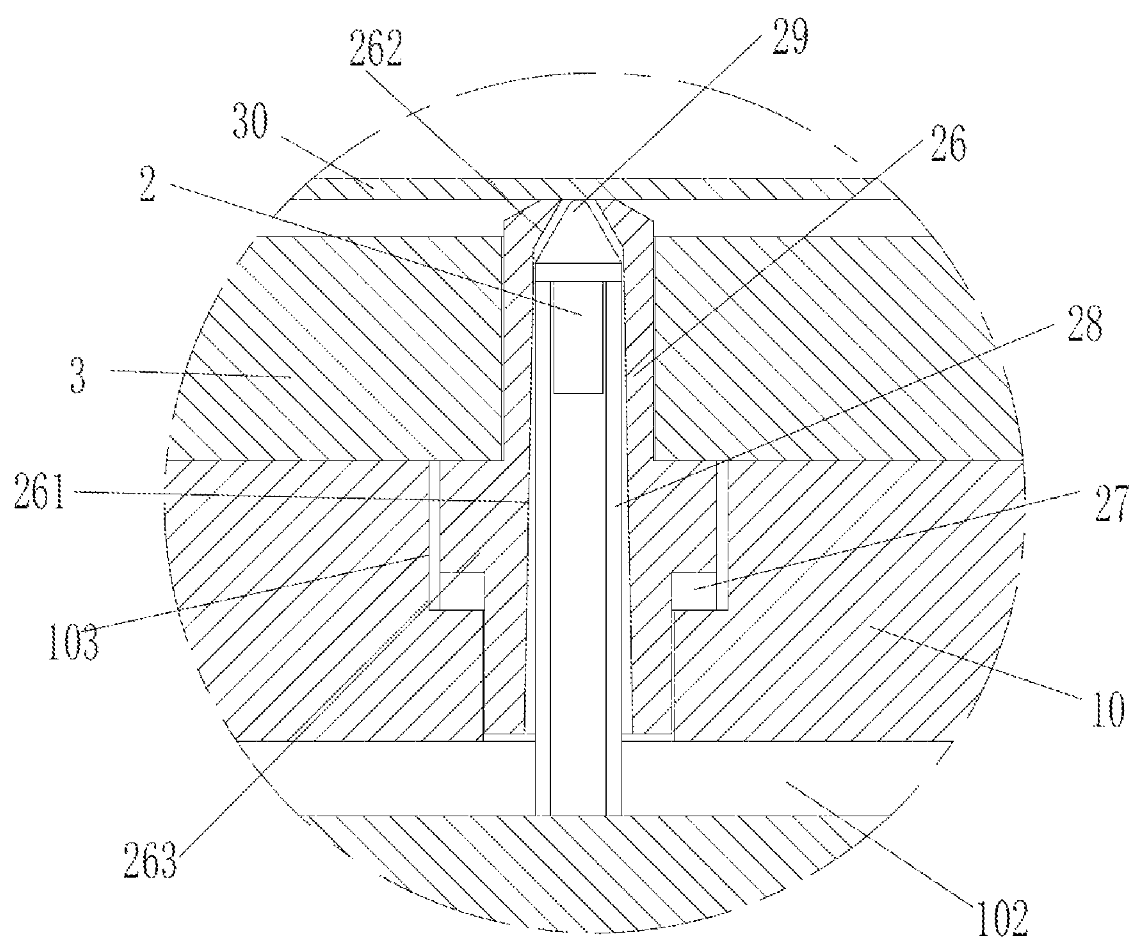
FIG. 5 is a schematic structural view illustrating a steel strip pressed downward against a nozzle according to an embodiment.
Figure 6:
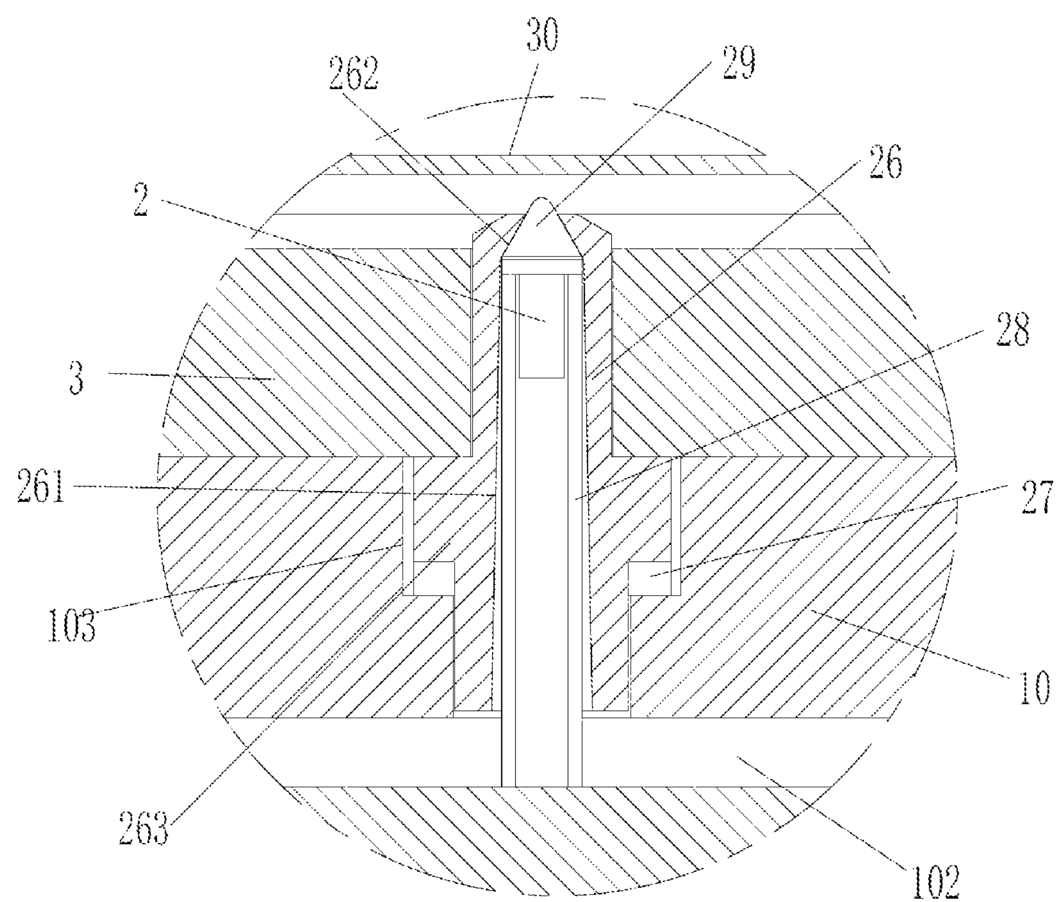
FIG. 6 is a schematic structural view illustrating a steel strip going away from a nozzle according to an embodiment.
Figure 7:
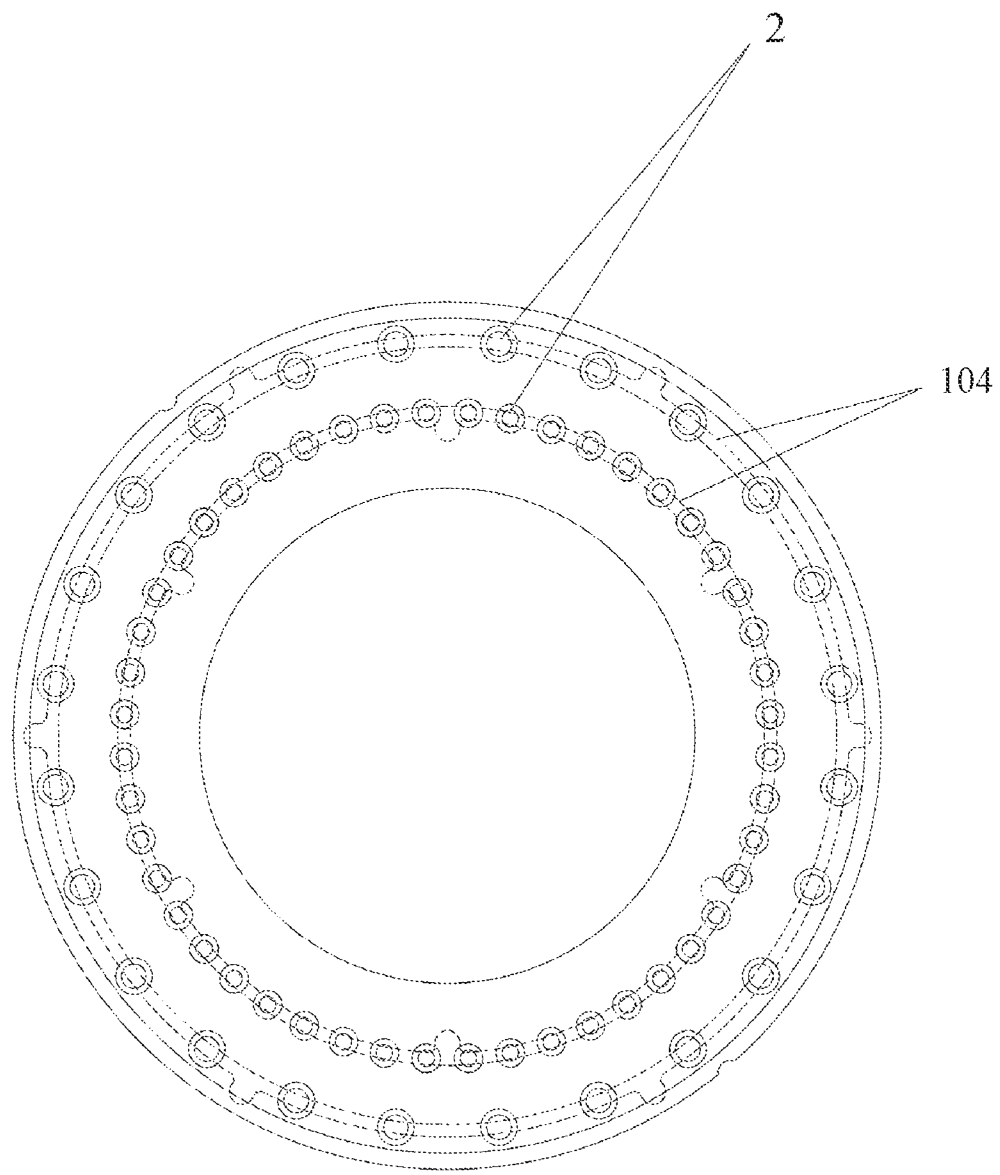
FIG. 7 is a first schematic structural view of a nozzle and an adhesive passage according to an embodiment.
Figure 8:
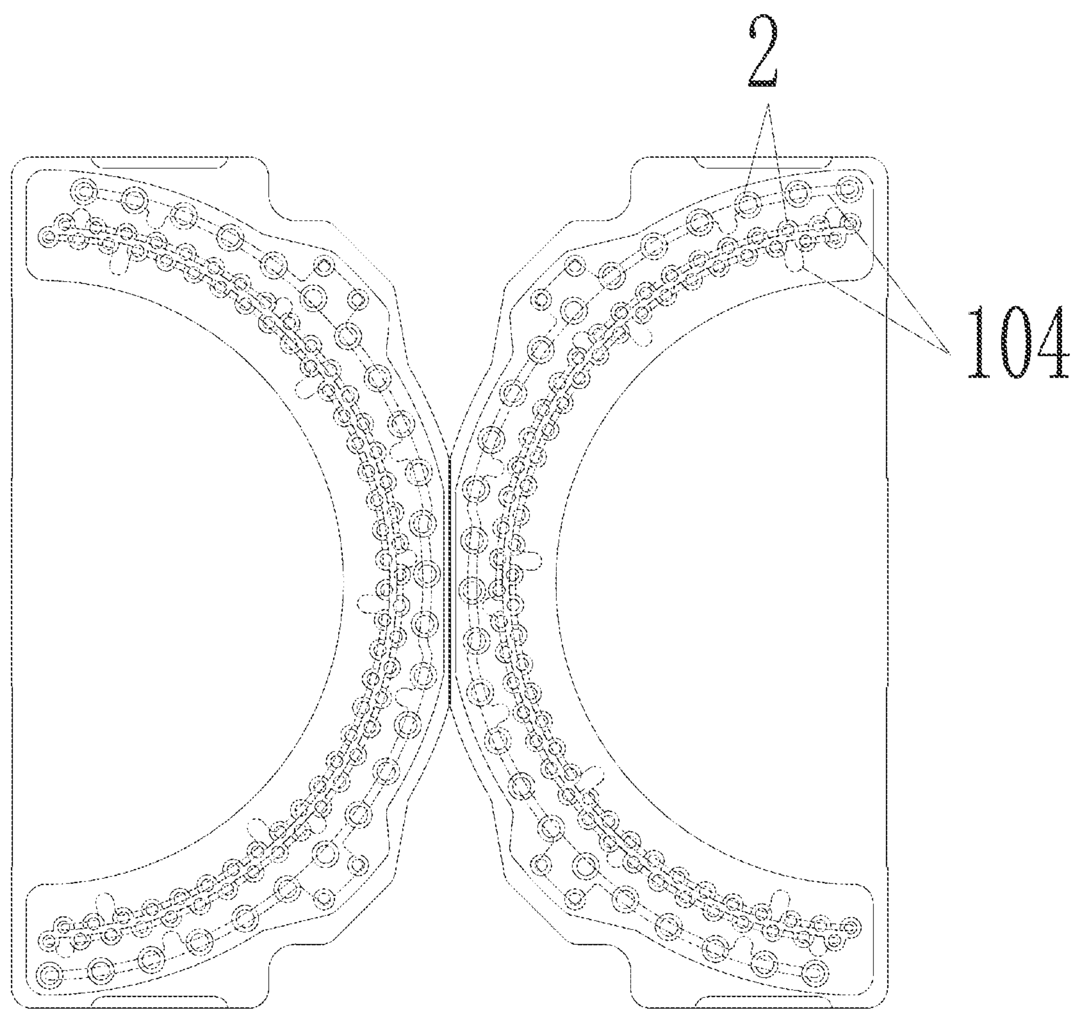
FIG. 8 is a second schematic structural view of the nozzle and the adhesive passage according to an embodiment.
Figure 9:
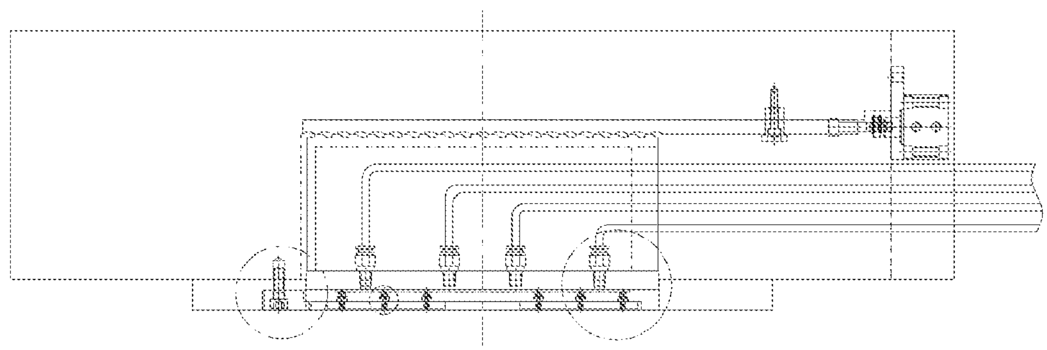
FIG. 9 is a third schematic structural view of the nozzle and the adhesive passage according to an embodiment.
Figure 10:
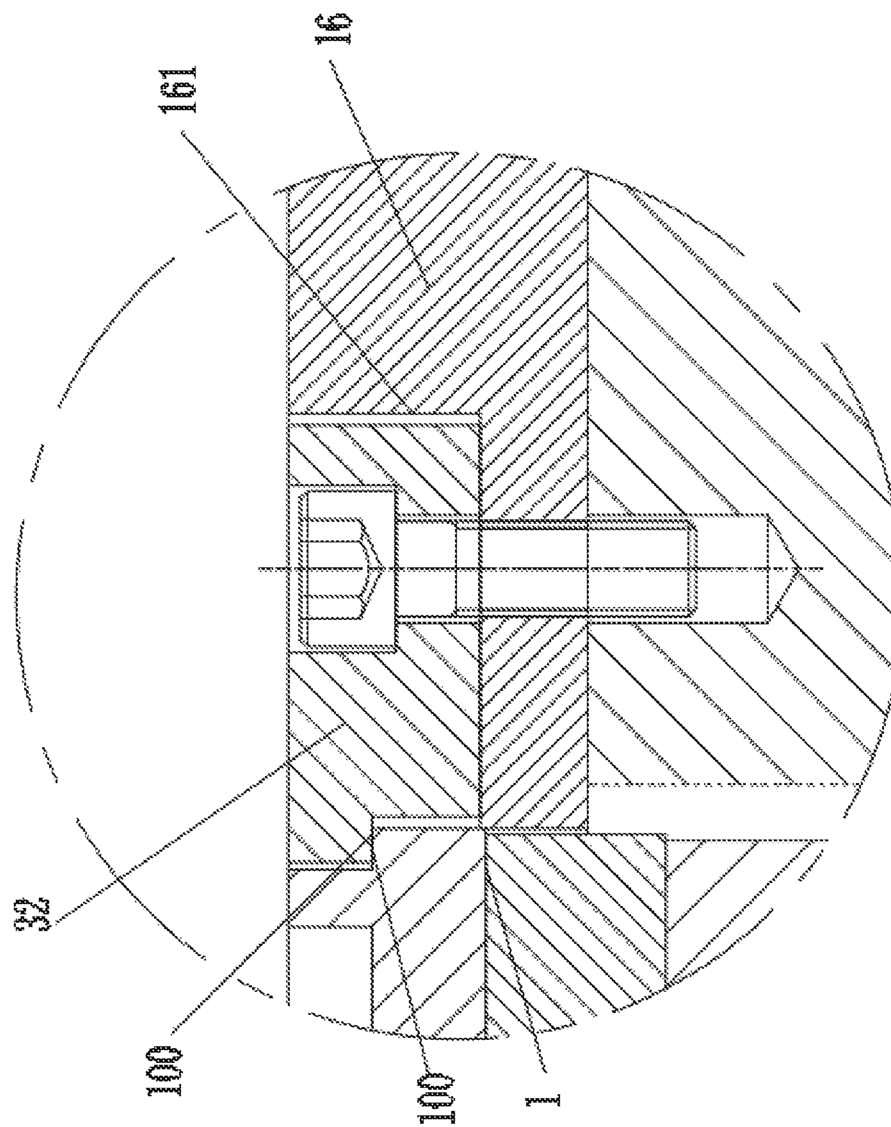
FIG. 10 is a partially enlarged view of FIG. 9.
Figure 11:
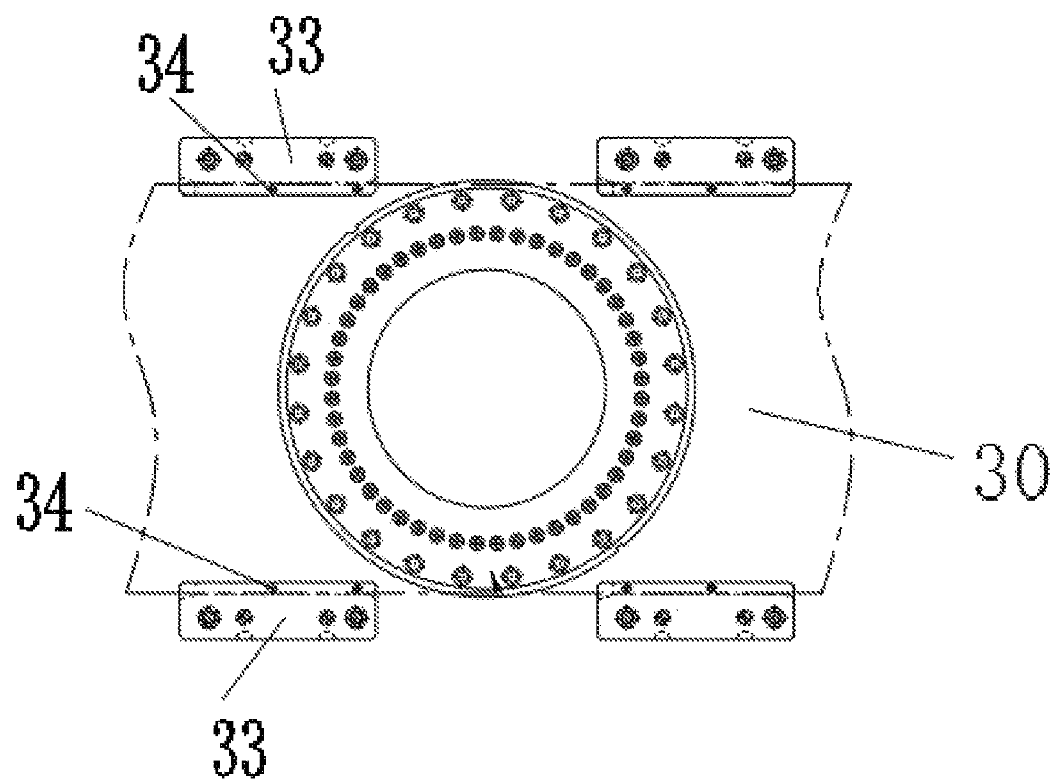
FIG. 11 is a schematic structural view of a side guide plate where a magnet is mounted according to an embodiment.
Figure 12:
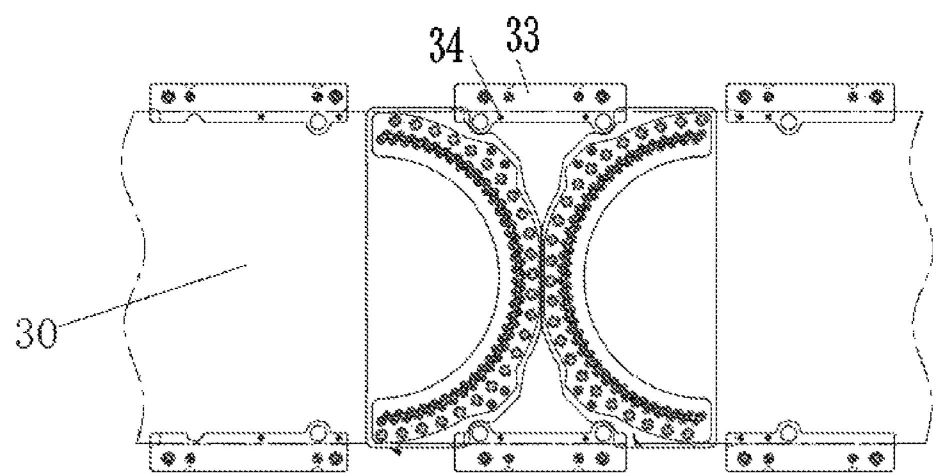
FIG. 12 is a fourth schematic structural view of the nozzle and the adhesive passage according to an embodiment.
Figure 13:
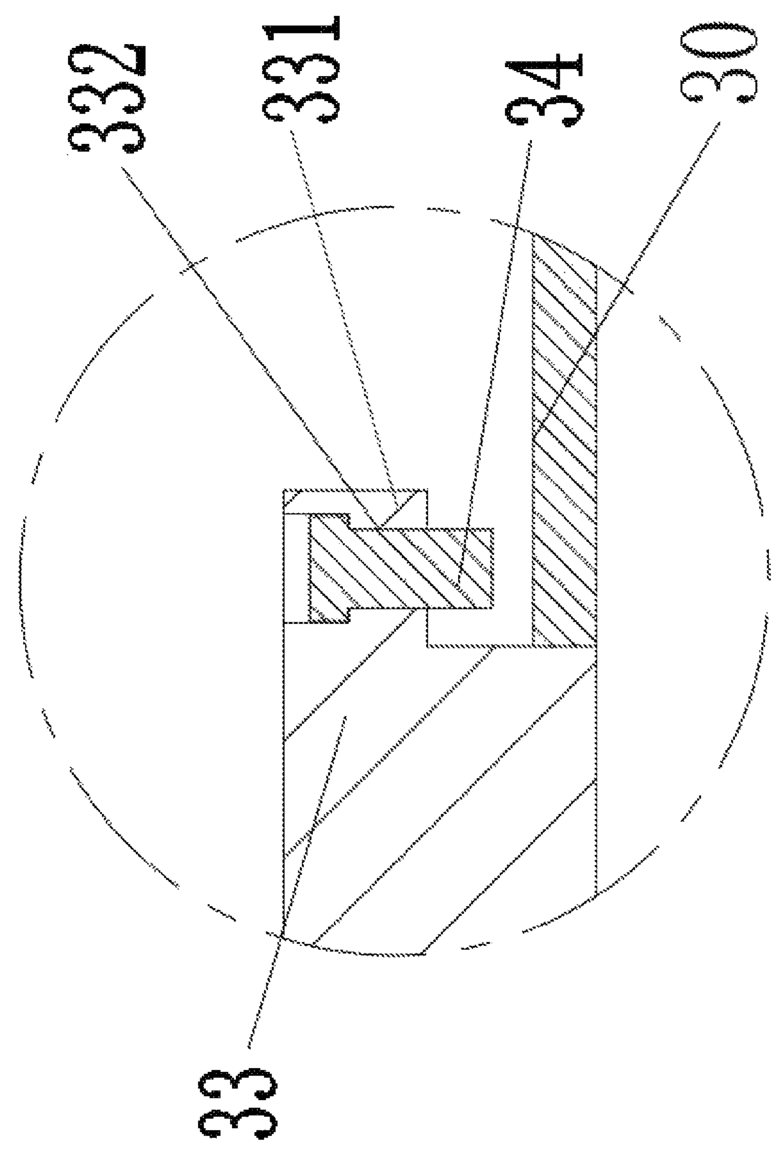
FIG. 13 is a schematic structural view of mounting of the magnet in the side guide plate according to an embodiment.

As illustrated in FIG. 1 to FIG. 8, an embodiment of the present disclosure provides an automatic adhesive spraying control system for progressive die of motor lamination core of a new energy vehicle includes a nozzle 2 and a nozzle fixing plate 1. The nozzle fixing plate 1 is provided with a mounting chamber 13. The nozzle 2 is received in the mounting chamber 13. A top portion of the mounting chamber 13 is a first conical hole 262 with an upper port being smaller than a lower port. A cone 29 at a top of the nozzle 2 is correspondingly inserted into the first conical hole 262. A spring 28 is arranged in the mounting chamber 13. Two ends of the spring 28 are respectively abutted against a bottom step surface of the cone 29 at the top of the nozzle 2 and a bottom side wall of the mounting chamber 13. A side wall of the cone 29 at the top of the nozzle 2 is provided with an ejecting hole, the side wall of the cone 29 provided with the ejecting hole is attached to an inner side wall of the first conical hole 262. The top of the nozzle 2 extends out of the upper port of the first conical hole 262. An inlet orifice 111 in communication with the mounting chamber 13 is arranged at a bottom of the nozzle fixing plate 1. An adhesive supply device is connected to the inlet orifice 111 via a pipe. An air pressure control system is mounted on the adhesive supply device. The air pressure control system supplies a push air pressure to an adhesive in the adhesive supply device and regulating a supplied push air pressure, such that a pressure ejected by the ejecting hole of the nozzle 2 for ejecting the adhesive is controlled and regulated to accommodate different adhesive ejecting and pressurizing devices. Therefore, depending on different stamping speeds of the stamping machine, air pressure transferred by the depressurizing valve 23 (that is, an air pressure control system) in an air pressure distribution control cabinet 22 to an adhesive cylinder 20 of the adhesive supply device is regulated.

Further, the nozzle fixing plate 1 includes an upper plate 10 and a lower cushion plate 11. A positioning hole 103 is arranged in a top surface of the upper plate 10. A nozzle positioning cylinder 26 is arranged in the positioning hole 103. A top end surface of the nozzle positioning cylinder 26 is flush with the top surface of the upper plate 10. The nozzle 2 is arranged in the first conical hole 262 at an upper end of an inner hole 261 of the nozzle positioning cylinder 26. The spring 28 is arranged in the inner hole 261 of the nozzle positioning cylinder 26. The lower cushion plate 11 is positioned on a bottom surface of the upper plate 10. A recess 102 in communication with the inner hole 261 of the nozzle positioning cylinder 26 is arranged on the bottom surface of the upper plate 10. Two ends of the spring 28 are respectively abutted against the lower cushion plate 11 and the nozzle 2. An adhesive passage 104 is formed between the recess 102 and a top surface of the lower cushion plate 11. An inlet orifice 111 in communication with an inner chamber is arranged on the lower cushion plate 11. A pipe connector 4 is mounted on the inlet orifice 111. By such configuration, the nozzle fixing plate 1 is divided into the upper plate 10 and the lower cushion plate 11 that may be combined, such that the nozzle 2 is conveniently mounted in the mounting chamber 13 (that is, the inner hole 261 of the nozzle positioning cylinder 26), thereby achieving reasonable structural design.

A groove 101 is arranged on the top surface of the upper plate 10. A press plate 3 is fixed to a groove bottom of the groove 101. The positioning hole 103 is arranged at the groove bottom of the groove 101. A middle ring body 263 of the nozzle positioning cylinder 26 is retained on a step on an inner side wall of the positioning hole 103, and the press plate 3 presses against the middle ring body 263 of the nozzle positioning cylinder 26. By such configuration, during mounting of the nozzle 2 in the adhesive passage 104, the nozzle 2 is positioned and fixed.

In this embodiment, a sealing member 27 is arranged between the middle ring body 263 of the nozzle positioning cylinder 26 and the step on the inner side wall of the positioning hole 103, such that a sealing configuration is constructed between the nozzle positioning cylinder 26 and the positioning hole 103.

In this embodiment, an inner hole 261 at a bottom of the first conical hole 262 on the nozzle positioning cylinder 26 is a second conical hole with an upper port being smaller than a lower port. The upper port of the second conical hole and the lower port of the first conical hole 262 have an identical diameter. By such configuration, the nozzle 2 is conveniently mounted in the inner hole of the nozzle positioning cylinder 26, and the nozzle 2 is pushed downward when the steel strip is pressed downward.

In this embodiment, the automatic adhesive spraying control system further includes a die (a recessed die fixing plate 16). The nozzle fixing plate 1 is arranged in a die hole of the die, and a retaining plate 32 is fixed to the die. A step 100 of the retaining plate 32 mates with a step 100 of the nozzle fixing plate 1 to retain the nozzle fixing plate 1. By such configuration, during assembling, when the adhesive spraying structure is rotated, the parts of the structure may not fall off. In addition, when the pull-out plate 7 functions, it may be more accurately ensured that upward jump of the nozzle fixing plate 1 is controlled within a limited range, and the nozzle fixing plate 1 jumping upward is retained. Since this structure is arranged on a front side of the die, mounting and dismounting of the adhesive spraying structure are both convenient, and maintenance and repair are also convenient.

In this embodiment, a strip 30 is arranged over the die (a recessed die fixing plate 16). A side guide plate 33 is arranged on each of two side positions corresponding to the strip 30. The side guide plate 33 is fixed into a positioning groove 161 of the die (the recessed die fixing plate 16) by a screw. The strip 30 is arranged between the side guide plate 33 and the die (the recessed die fixing plate 16). An extending portion 331 of the side guide plate 33 is provided with a mounting through hole 332. A magnet 34 is fitted and fixed in the mounting through hole 332. A mounting through hole 332 (a counter bore or a via hole) is opened on the side guide plate 33. A circular T-shaped magnet is assembled, by interference fitting, onto the mounting through hole 332 of the side guide plate 33. The nozzle 2 at this station is higher than the plane of the recessed die fixing plate 16. Arrangement of the side guide plate 33 is to prevent over-great dithering of the strip 30, and ensure that the horizontal dithering amplitude of the stripe 30 is controlled within a reasonable range. During transportation of the strip 30, to prevent the adhesive on the strip 30 from being touched and removed by other nozzles 2, regardless of being in a static state or a dynamic state, the strip 30 needs to be in a floating state. Therefore, on the side guide plates 33 at the front, middle, and rear positions of the adhesive spraying structure, magnetic structures are arranged. The magnets 34 constantly hold an attracting force against the strip 30 (a silicon steel strip), such that the strip 30 may be quickly attracted to the floating state immediately upon being pressed against the nozzle 2.

In this embodiment, the automatic adhesive spraying control system further includes an elevating drive device configured to drive the upper plate 10, the lower cushion plate 11, and the nozzle 2 to be simultaneously displaced upward and downward. The elevating drive device is mounted on a bottom surface of a lower cushion plate 11 and includes an air cylinder 6. An elevating block 5 is positioned on the bottom surface of the lower cushion plate 11. A pull-out plate 7 is attached on a bottom surface of the elevating block 5. The bottom surface of the elevating block 5 and a top surface of the pull-out plate 7 define a plurality of mating tooth blocks 9 by virtue of a plurality of mating slots 8 that are equally spaced apart. The mating tooth blocks 9 are correspondingly inserted into the mating slots 8. A side wall of the mating slot on the elevating block 5 is attached to a side wall of the mating slot 8 on the pull-out plate 7, and the two attached side walls are ramps 71 with an identical inclination angle. A piston rod end portion of the air cylinder 6 is fixedly connected to one end of the pull-out plate 7.

By the above structure, the elevating block 5 moves downward such that the upper plate 10 and the lower cushion plate 11 are caused to simultaneously move downward. By such downward movement, the nozzle 2 is moved underneath the top surface of the recessed die fixing plate 16, such that the case where the iron core at the bottom of the recessed die fixing plate 16 in the lamination core stamped on the lamination steel strip 30 is attached with the adhesive is prevented. Upon completion of stamping, the piston rod of the air cylinder extends out of the cylinder 6, and hence causes the pull-out plate 7 to be moved rightward. Then, by the ramp 71, the bottom of the mating tooth block of the elevating block 5 is abutted against the top of the mating tooth block 9 of the pull-out plate 7, such that the elevating block 5 is elevated. In this case, the upper plate 10, the lower cushion plate 11, and the nozzle 2 simultaneously move upward, such that the top of the nozzle 2 protrudes out of the top surface of the recessed die fixing plate 16.

In this embodiment, the adhesive supply device includes an adhesive cylinder 20, an air pressure distribution control cabinet 22 (an air pressure control system) configured to regulate an air pressure for air compression, and an adhesive cylinder diverter 21. A plurality of inlet orifices 111 are arranged on the lower cushion plate 11, and the pipe connector 4 is arranged on each of the inlet orifices 111. An adhesive inlet 211 and a plurality of diverting outlets 212 are arranged on the adhesive cylinder diverter 21. An air outlet 25 of the air pressure distribution control cabinet 22 is in communication with an adhesive inlet port of the adhesive cylinder 20 by the pipe, and an adhesive outlet port of the adhesive cylinder 20 is in communication with an adhesive inlet 211 on the adhesive cylinder diverter 21. The diverting outlets 212 are respectively in communication with the pipe connectors 4 by the pipe. The air pressure distribution control cabinet 22 includes a cabinet and at least two depressurizing devices arranged in the cabinet. An air inlet on the cabinet is in communication with at least two branch air pipes. Each of the branch air pipes is in communication with the corresponding depressurizing device by a branch pipe. An air outlet 25 of the depressurizing device being in communication with the air outlet 25 on the cabinet. The depressurizing device includes a plurality of depressurizing valves 23. An air inlet of each of the depressurizing valves 23 is in communication with the branch air pipe by the branch pipe, and an air outlet 25 of the depressurizing valve 23 is in communication with the air outlet 25 of the cabinet by the pipe.

Based on the adhesive supply device and the air control system, a pneumatic power source supplies compressed air, and the compressed air enters each of the depressurizing valves 23 in the air pressure distribution control cabinet 22. Each depressurizing valve 23 corresponds to an adhesive cylinder 20. The adhesive cylinder 20 and the depressurizing valve 23 are connected likewise by a compressed air pipe. The compressed air extrudes the adhesive (the glue) from the adhesive cylinder 20 by virtue of air pressure. The adhesive runs into the adhesive cylinder diverter 21 via the adhesive pipe. The adhesive cylinder diverter 21 is provided with a plurality of diverting outlets 212. Each of the diverting outlets 212 is in communication with an adhesive diverting pipe. Each of the diverting pipes is in communication with an inlet orifice 111 of the adhesive passage 104 of the die, such that automatic adhesive dispensing and adhesive ejection upon pressure regulation are further implemented.

A liquid flowmeter 31 is arranged on the pipe connected between the adhesive cylinder 20 and the adhesive cylinder diverter 21. An upper flow limit and a lower flow limit are predefined in the liquid flowmeter 31. When a liquid discharged from the pipe exceeds the upper flow limit or the lower flow limit, the liquid flowmeter 31 transmits detected data to a PLC control system of the stamping machine, and the PLC control system controls an alarming device (a sound and light alarming device) to generate an alarm.

Based on the stamping speed output by the stamping machine employed by the progressive die, the depressurizing valve 23 is correspondingly controlled to regulate the pressure of the output gas, such that the pressure of ejecting adhesive by the nozzle 2 is regulated. In practice, the depressurizing valve 23 employs an electrical proportional depressurizing valve 23, which is controlled by a PLC control system based on the stamping speed of the stamping machine. Therefore, an internally configured program in the PLC control system control the electrical proportional depressurizing valve based on the stamping speed data of the stamping machine, such that the pressure of outputting the gas is regulated by the electrical proportional depressurizing valve. In this way, the pressure of the nozzle 2 for ejecting the adhesive is further regulated, and thus the pressure of the ejected adhesive is adjusted depending on different stamping speeds of the stamping machine.

The motor lamination core manufacturing device employing the above structure specifically includes an upper die seat 14, an unloading plate seat 15, an unloading plate 18, a recessed die fixing plate 16, and a lower die seat 17. The lower die seat 17 is provided with a recessed chamber, a pull-out plate 7 and a elevating block 5 are both arranged in the recessed chamber, the air cylinder 6 is fixed to the lower die seat 17, the recessed die fixing plate 16 is fixed to a position, at an upper opening of the recessed chamber, of a top surface of the lower die seat 17, a nozzle fixing plate 1 is arranged in the die hole of the recessed die fixing plate 16, a top surface of the nozzle fixing plate 1 is flush with a top surface of the recessed die fixing plate 16, the upper die seat 14 is arranged above the recessed die fixing plate 16, the unloading plate seat 15 is fixed to a bottom surface of the upper die seat 14, and the unloading plate 18 is fixed to the bottom surface of the unloading plate seat 15.

During die stamping, a slide block on the stamping machine drives the upper die seat 14 and the unloading plate seat 15, and the unloading plate 18 down at the same time. In this case, the unloading plate 18 is held, and the stripe 30 moves downward to cause the nozzle 2 to move downward, such that a gap is defined between the side wall of the conical head of the nozzle 2 and the inner side wall of the first conical hole 262 of the nozzle 2. Under the effect of air pressure, the adhesive is ejected along the gap, such that the adhesive is maintained on the strip 30. Upon completion of stamping, when the slide block on the stamping machine moves upward, the upper die seat 14 the unloading plate seat 15, and the unloading plate 18 are elevated together with the sliding block. Since the unloading plate 18 does not hold the strip 30 any longer, under the effect of the spring 28, the nozzle 2 moves upward, and a sealed chamber is defined to close the ejecting hole of the nozzle 2, when the conical surface of the nozzle is totally attached on the conical surface of the nozzle positioning cylinder 26. Adhesive dispensing amounts in different adhesive passages 104 are different, and different adhesive passages discharges adhesives with different pressures. In addition, depending on different stamping speeds, the pressure in the depressurizing valve 23 in the air pressure distribution control cabinet 22 varies accordingly, such that the pressure of the adhesive ejected from the nozzle 2 is regulated. When the ejected adhesive is an anaerobic adhesive, before stamping of the strip 30, a promoter needs to be sprayed on the top surface of the strip 30, such that a plurality of lamination cores stamped by the progressive die are bonded more securely and reliably.

The present disclosure is not limited to the above described embodiments, and any person could derive other various products under inspiration of the present disclosure. However, any variation in terms of shape or structure shall be considered as falling within the protection scope of the present disclosure as long as the same or similar technical solutions are employed as the present disclosure.

The invention claimed is:

1. An automatic adhesive spraying control system for progressive die of motor lamination core of a new energy vehicle, comprising: a nozzle and a nozzle fixing plate, the nozzle fixing plate being provided with a mounting chamber, the nozzle being received in the mounting chamber, a top portion of the mounting chamber being a first conical hole with an upper port being smaller than a lower port, a cone at a top of the nozzle being correspondingly inserted into the first conical hole, a spring being arranged in the mounting chamber, two ends of the spring being respectively abutted against a bottom of the nozzle and a bottom side wall of the mounting chamber; wherein a side wall of the cone at the top of the nozzle is provided with an ejecting hole, the side wall of the cone provided with the ejecting hole is attached to an inner side wall of the first conical hole, the top of the nozzle extends out of the upper port of the first conical hole, and an inlet orifice in communication with the mounting chamber is arranged at a bottom of the nozzle fixing plate; an adhesive supply device being connected to the inlet orifice via a pipe, an air pressure control system being mounted on the adhesive supply device, the air pressure control system supplying a push air pressure to an adhesive in the adhesive supply device and regulating a supplied push air pressure, such that a pressure ejected by the ejecting hole of the nozzle for ejecting the adhesive is controlled and regulated.

2. The automatic adhesive spraying control system for the progressive die of the motor lamination core of the new energy vehicle according to claim 1, wherein the nozzle fixing plate comprises an upper plate and a lower cushion plate, a positioning hole being arranged in a top surface of the upper plate, a nozzle positioning cylinder being arranged in the positioning hole, the nozzle positioning cylinder and the positioning hole being sealed to each other, a top end surface of the nozzle positioning cylinder being flush with the top surface of the upper plate, the nozzle being arranged in the first conical hole at an upper end of an inner hole of the nozzle positioning cylinder; wherein the spring is arranged in the inner hole of the nozzle positioning cylinder, the lower cushion plate is positioned on a bottom surface of the upper plate, a recess in communication with the inner hole of the nozzle positioning cylinder is arranged on the bottom surface of the upper plate, and two ends of the spring are respectively abutted against the lower cushion plate and the nozzle, an adhesive passage being formed between the recess and a top surface of the lower cushion plate, an inlet in communication with an inner chamber being arranged on the lower cushion plate, a pipe connector being mounted on the inlet;

wherein an inner hole at a bottom of the first conical hole on the nozzle positioning cylinder is a second conical hole with an upper port being smaller than a lower port, the upper port of the second conical hole and the lower port of the first conical hole having an identical diameter;

wherein a groove is arranged on the top surface of the upper plate, a press plate being fixed to a groove bottom of the groove; wherein the positioning hole is arranged at the groove bottom of the groove, a middle ring body of the nozzle positioning cylinder is retained on a step on an inner side wall of the positioning hole, and the press plate presses against the middle ring body of the nozzle positioning cylinder.

3. The automatic adhesive spraying control system for the progressive die of the motor lamination core of the new energy vehicle according to claim 1, further comprising a die, wherein the nozzle fixing plate is arranged in a die hole of the die, and a retaining plate is fixed to the die, a side step of the retaining plate mating with a step of the nozzle fixing plate to retain the nozzle fixing plate.

4. The automatic adhesive spraying control system for the progressive die of the motor lamination core of the new energy vehicle according to claim 1, wherein when the adhesive ejected by the nozzle is an anaerobic adhesive, a promoter is sprayed on a top surface of a strip prior to stamping of the strip.

5. The automatic adhesive spraying control system for the progressive die of the motor lamination core of the new energy vehicle according to claim 3, wherein a strip is arranged over the die, and a side guide plate is arranged at a side position of the strip, the side guide plate being fixed to the die, the strip being arranged between an extending portion of the side guide plate and the die, a mounting through hole being arranged at the extending portion of the side guide plate, a magnet is fitted and fixed in the mounting through hole.

6. The automatic adhesive spraying control system for the progressive die of the motor lamination core of the new energy vehicle according to claim 2, further comprising an elevating drive device configured to drive the upper plate, the lower cushion plate, and the nozzle to be simultaneously displaced upward and downward; wherein the elevating drive device is mounted on a bottom surface of the lower cushion plate and comprises an air cylinder, and an elevating block is positioned on the bottom surface of the lower cushion plate, a pull-out plate being attached on a bottom surface of the elevating block, the bottom surface of the elevating block and a top surface of the pull-out plate defining a plurality of mating tooth blocks by virtue of a plurality of mating slots that are equally spaced apart, each of the mating tooth blocks being correspondingly inserted into the plurality of mating slots; a side wall of the mating slot on the elevating block is attached to a side wall of the mating slot on the pull-out plate, and the two attached side walls are ramps with an identical inclination angle; and a piston rod end portion of the air cylinder is fixedly connected to one end of the pull-out plate.

7. The automatic adhesive spraying control system for the progressive die of the motor lamination core of the new energy vehicle according to claim 2, wherein the adhesive supply device comprises an adhesive cylinder, an air pressure distribution control cabinet configured to regulate an air pressure for air compression, and an adhesive cylinder diverter, a plurality of inlet orifice are arranged on the lower cushion plate, and the pipe connector is arranged on each of the inlet orifices; wherein an adhesive inlet and a plurality of diverting outlets are arranged on the adhesive cylinder diverter, an air outlet of the air pressure distribution control cabinet is in communication with an adhesive inlet port of the adhesive cylinder by the pipe, an adhesive outlet port of the adhesive cylinder is in communication with an adhesive inlet on the adhesive cylinder diverter, and the plurality of diverting outlets are respectively in communication with the pipe connectors by the pipe.

8. The automatic adhesive spraying control system for the progressive die of the motor lamination core of the new energy vehicle according to claim 5, wherein the air pressure distribution control cabinet comprises a cabinet and at least two depressurizing devices arranged in the cabinet, an air inlet on the cabinet is in communication with at least two branch air pipes, each of the branch air pipes being in communication with the corresponding depressurizing device by a branch pipe, an air outlet of the depressurizing device being in communication with the air outlet on the cabinet by the pipe;

wherein the depressurizing devices comprise a plurality of depressurizing valves, an air inlet of each of the depressurizing valves being in communication with the branch air pipe by the branch pipe, and an air outlet of each of the depressurizing valves being in communication with the air outlet of the cabinet by the pipe.

9. The automatic adhesive spraying control system for the progressive die of the motor lamination core of the new energy vehicle according to claim 5, wherein a liquid flowmeter is arranged on the pipe connected between the adhesive cylinder and the adhesive cylinder diverter; wherein an upper flow limit and a lower flow limit are predefined in the liquid flowmeter, and an alarm is generated by an alarming device when a flow of a liquid discharged from the pipe exceeds the upper flow limit or the lower flow limit.

10. The automatic adhesive spraying control system for the progressive die of the motor lamination core of the new energy vehicle according to claim 8, wherein based on a stamping speed output by a stamping device used by the progressive die, each of the depressurizing valves is correspondingly controlled to regulate a pressure of an output gas, such that a pressure of the adhesive ejected by the nozzle is regulated.

* * * * *